United States Patent [19]

Brambilla

[11] Patent Number: 4,685,270

[45] Date of Patent: Aug. 11, 1987

[54] PROCESS FOR CONTINUOUS WRAPPING AN OBJECT AND MACHINE FOR CARRYING OUT THE PROCESS

[75] Inventor: Dario Brambilla, Novara, Italy

[73] Assignee: Dario Manuli S.p.A., Italy

[21] Appl. No.: 545,852

[22] Filed: Oct. 27, 1983

[30] Foreign Application Priority Data

Oct. 27, 1982 [IT] Italy .................................. 23963 A/82
Mar. 4, 1983 [IT] Italy .................................. 19918 A/83

[51] Int. Cl.$^4$ ............................................. B65B 11/04
[52] U.S. Cl. ........................................ 53/176; 53/211; 53/556; 53/557
[58] Field of Search ................. 53/211, 176, 556, 587; 56/341

[56] References Cited

U.S. PATENT DOCUMENTS

| | | | |
|---|---|---|---|
| 1,654,258 | 12/1927 | Hooper | 53/176 |
| 3,407,565 | 10/1968 | Bender | 53/380 |
| 4,281,500 | 8/1981 | Mueller | 53/211 |
| 4,282,700 | 8/1981 | Goldstein | 53/556 |
| 4,288,971 | 9/1981 | McClure | 56/341 |
| 4,343,132 | 8/1982 | Lawless, Jr. | 53/211 X |
| 4,409,784 | 10/1983 | Van Ginhoven | 53/430 |
| 4,499,714 | 2/1985 | Hollman | 56/341 |

FOREIGN PATENT DOCUMENTS

| | | | |
|---|---|---|---|
| 79321 | 5/1983 | European Pat. Off. | 53/211 |
| 1017523 | 10/1957 | Fed. Rep. of Germany | 53/587 |
| 2656896 | 6/1978 | Fed. Rep. of Germany | 56/341 |
| 2151116 | 8/1978 | Fed. Rep. of Germany | 53/576 |
| 2705101 | 8/1978 | Fed. Rep. of Germany | 53/587 |
| 2056401 | 3/1981 | United Kingdom | 53/556 |
| 514748 | 6/1976 | U.S.S.R. | 53/211 |

*Primary Examiner*—John Sipos
*Attorney, Agent, or Firm*—Lane and Aitken

[57] ABSTRACT

In order to ensure an extended preservation term to a feeding product for animals, such as hay, straw and fodder, after harvest the product is compressed to form a cylindrically shaped body or object and then helically wrapped up with a web-like film of plastics material.

To this end, the body or object is brought to bear on a series of drive rollers imparting thereto a rotary motion about its own axis, while from a reel or roll which is provided with a continuous rotary motion about said body or object the web like film is unwound.

The cross-wrapping of the heap is advantageously completed by a peripheral supplementary wrapping of the heap.

10 Claims, 11 Drawing Figures

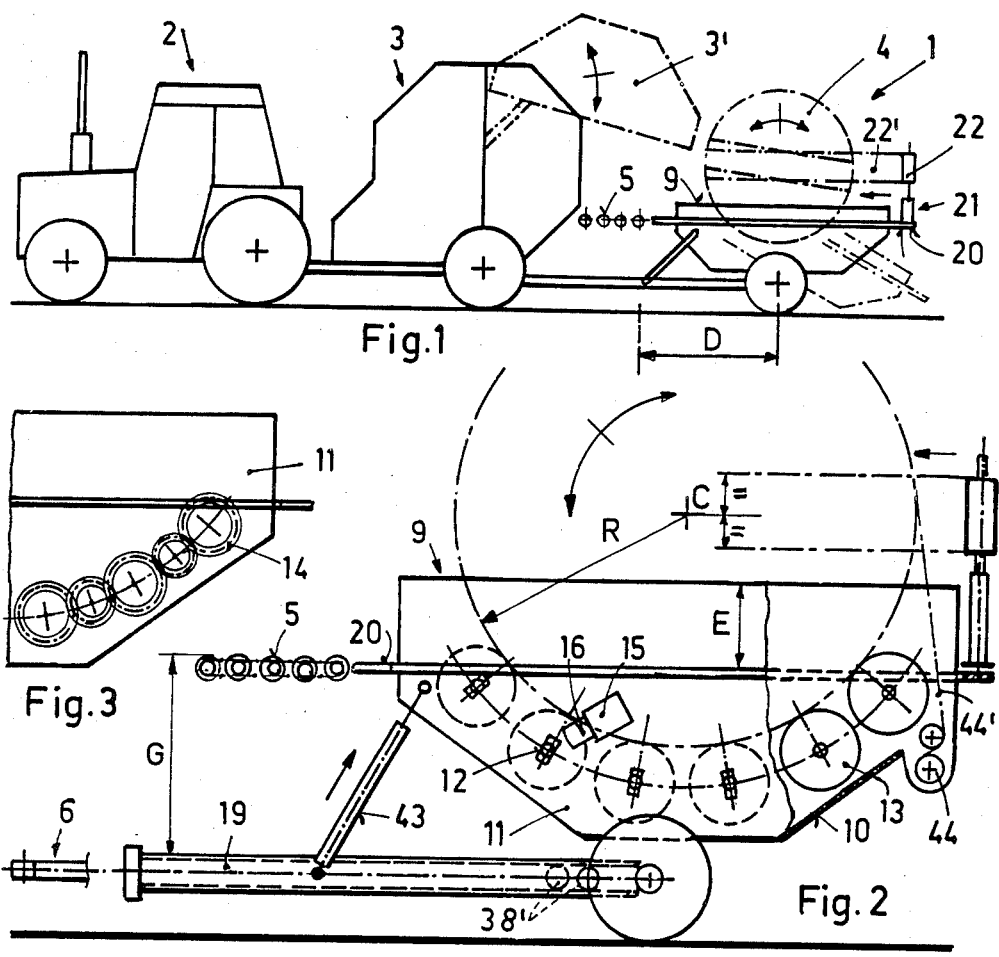
Fig.1
Fig.3
Fig.2
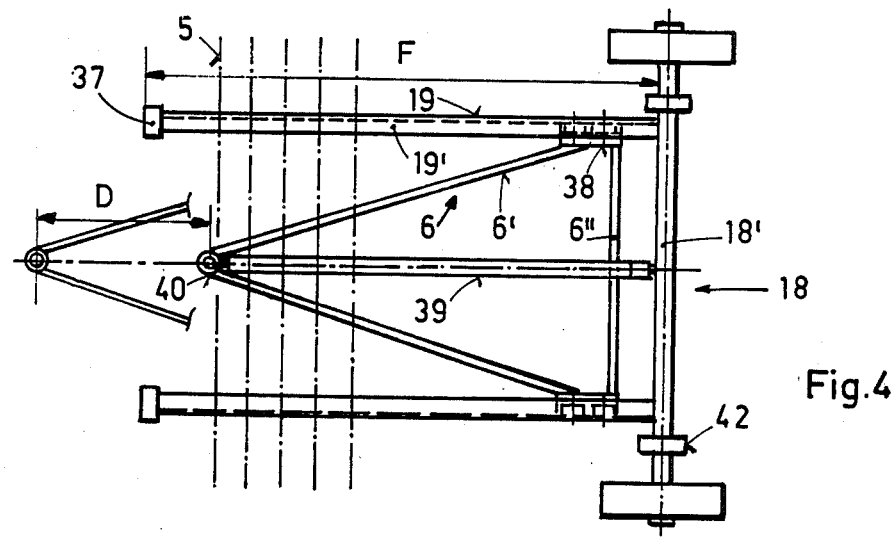
Fig.4

PROCESS FOR CONTINUOUS WRAPPING AN OBJECT AND MACHINE FOR CARRYING OUT THE PROCESS

This invention relates to a process for continuously and hermetically wrapping an object or body of cylindrical or any polygonal shape with an extensible self-adhesive film, which process is particularly applicable to wrapping of cylindrical hay heaps or bales.

Several equipments are known for continuous wrapping of an assembly of goods, particularly assembled goods. However, such equipments are unfit for carrying out a total as well as hermetic wrapping of a product.

It is the object of the present invention to provide a process and means for wrapping, or driving an extensible self-adhesive film completely around a bulky object or body, particularly a perishable product, and this is a short interval of time.

According to the invention, in order to accomplish this task, it is proposed that the wrapping operation is accomplished by unwinding the film from at least one reel or roll, rotating along a circular, polygonal or equivalent path, said path lying in a plane in which the axis of the object or body is located, which object or body is provided in turn with a continuous rotary motion about said axis, the latter being furthermore arranged in a plane within the lower and upper end edges of the film being unwound from the reel or roll.

The machine for carrying out the process is characterized by comprising a preferably wheeled assembly, having mounted thereon a series of cylindrical rollers, driven and distributed along a sector or circle arc of a cradle, the center of said arc coinciding with the axis of the object or body to be wrapped up, said series of rollers being encircled by a track, a trolley forward moving thereon and from which the extensible self-adhesive film is unwound from a reel or roll.

The invention is also concerned with the use of the wrapped up product, such as long maturity preserved fodder.

According to a further embodiment, the machine is characterized in that the series of rollers or cradle is tiltable about an axis parallel arranged with respect to a vertical plane through the longitudinal axis of said rollers, that as the object or body is being wrapped up said axis is arranged at displaced position with respect to the plane perpendicular to the axis of said object or body, and that the reel or roll, of which the axis is provided with a continuous rotary motion around the object or body to be wrapped up, is kept suspended in its rotational movement about the object or body at a zone which is independent of the cradle tilting displacements.

It is a particular advantage of the invention that the wrapped up product, particularly a compressed hay heap or bale, such as of cylindrical shape, which may be of considerable size and weight, for example a diameter up to 1,800 mm and as long as 1,700 mm and having a weight of 1,600 kilograms, may be wrapped up just after the formation thereof. To this purpose, the wrapping up assembly closely follows the bale forming machine, thereby limiting laborious and expensive handlings, and assuring an immediate protection thereof, by hermetically wrapping it up and thus providing a safe and durable preservation thereof.

It is also provided the use of an extensible type of film having a retarding substance incorporated or in the form of a layer applied thereon which, upon occurrence of hermetic wrapping, converts the oxygen enclosed by said wrapping to $CO_2$. Thereby any alteration of the product is avoided, such as development of mould, thus maintaining the fodder at optimum conditions, which cannot be attained in known type of silos or storage bins. This type of hermetic wrapping with barrier effect, that is without any exit of gases or air immission, is provided as applicable to various products, also of not edible type.

It is also provided the use of what is protected for packing of goods to be dispatched or forwarded or to be transported, such as, for example, reels or rolls of plastics, paper and the like, to this end providing even perforated films. For such a packing, the machine is provided as stationary, that is unwheeled.

Finally, still within the invention range, it is provided that the product to be completely wrapped up may rotate both about the axis thereof and about an axis which is at least nearly perpendicular and passing through said axis of the product, in this case remaining stationary the mandrel from which the film is being unwound.

The accompanying drawings show an exemplary embodiment constituting constructive implementations of particular advantage according to the inventive idea.

In the drawings:

FIG. 1 is a view schematically showing the arrangement of the equipment according to the invention in a suite of tractor and a hay harvesting machine for forming compressed hay bales;

FIG. 2 is an enlarged fragmentary side view of an equipment;

FIG. 3 is a side view as opposite to that of FIG. 2;

FIG. 4 is a schematic top plan view showing the assembly of a wheel and drawbar of the equipment;

Figures 5, 8:
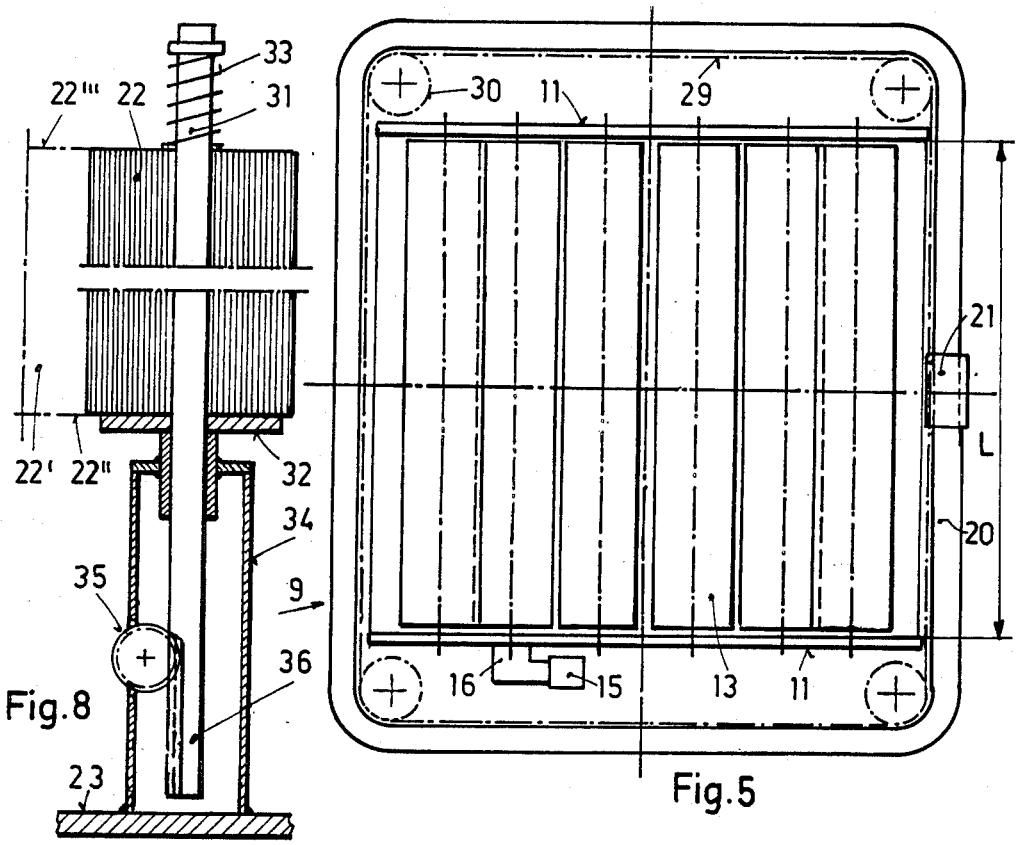
FIG. 5 is a fragmentary top plan view showing the cradle with sliding surface for the reel or roll carrying trolley.
FIG. 8 is a view schematically showing the housing for a reel or roll on the trolley of FIG. 5, and respective adjusting members for braking the unwinding thereof and setting of the reel or roll at vertical direction.

Referring to FIG. 1, the arrangement is schematically shown therein for an apparatus 1 according to the invention, in a suite of tractor 2 and press 3. Such presses 3, particularly known as rotorpresses, are now widely used in the field of hay harvesting machines. Such machines provide for gathering the hay as scattered on the ground and then pressing the same in the form of cylindrically shaped bales 4. The bales are made within the press, which comprises a chamber provided with transversely arranged rollers in the advancing direction of the press and which are therein arranged along an annular path.

Upon being formed, the bale is ejected, to this end upwardly, upsetting the rear portion 3' (FIG. 1) of the press.

According to the present invention, the cylindrically shaped finished bale is ejected on a series of first rollers 5, the latter being arranged transversely above a drawbar 6 (FIG. 4) of the apparatus. Whereupon, the bale in introduced into the cradle 9 up to over rollers for packing thereat and then unloading on the ground.

In order to provide for passing said bale 4 from press 3 to cradle 9, it is contemplated that upon ejection from the press and for enabling said upward setting of the rear portion 3' of the press 3, the apparatus 1 is temporarily moved away from the press by a distance D (FIGS. 1 and 4).

Figure 9:
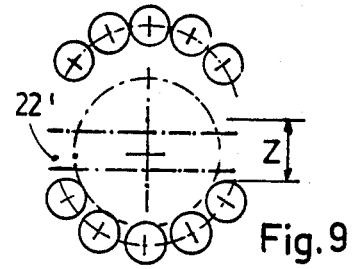
FIG. 9 is showing the change or variant in an equipment for packing implementation on the rotorpress.

Referring to FIGS. 2 and 5, the above mentioned cradle 9 comprises a base 10 and two longitudinal sides 11 spaced apart by a distance L (FIG. 5), against which sides such bearings 12 are mounted as carrying rollers 13 which, in turn, are arranged along a limited arc of circle, the center C of which coincides with the axis of the bale which is thereat rotated and packed. The cylindrical rollers 13 cooperate with one another by means of gear wheels 14 (FIG. 3), of which at least one is driven by a motor 15 (FIG. 5) with the interposition of a reduction gear 16 and bevel gear pair. The rollers 13 (FIGS. 2 and 9) of a somewhat larger length than that of bales 4 are arranged close to one another. In order to meet the requirement of rotatably presetting even bales of a different radius R on said rollers 13, the bearings 12 of rollers 13 and radially displaceable in said sides 11.

Figures 6, 7:
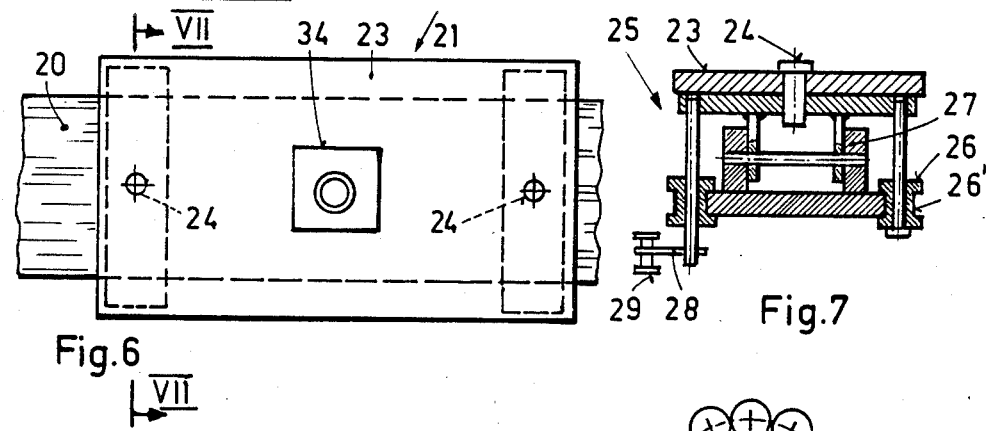
FIG. 6 is a top plan view schematically showing the trolley of FIG. 5.
FIG. 7 is a cross-sectional view taken along line VII—VII of FIG. 6.

The cradle 9, which is wheeled by means of an assembly of wheels 18 (FIG. 4), drawbar 6 and spacers 19, is encircled by a track 20, implemented as an iron strip and mounted against sides 11 at a distance E below the upper edge thereof. A trolley 21 supporting the reel or roll 22 of the extensible film 22' is slidable along said track 20. The trolley 21 (FIGS. 6 and 7) comprises a plate 23 with an assembly 25 rotatable at the heads at 24 and guided by the track 20. Said assemblies 25 are provided at the ends thereof with rollers 26 rotable about a vertical axis, such rollers having on the circumference thereof a groove 26' for guiding and holding the assembly with respect to the track 20.

Further rollers or wheels 27 vertically support the base 23 with respect to the track 20. One of these assemblies 25 and said trolley 21 therewith is drawn along the track 20 by a drawing means 28 and claim 29 (FIGS. 5 and 7), which chain is arranged with the axis of the links parallel to the inner edge of track 20.

The chain 29 is rotatably mounted on suitable gear wheels 30 (FIG. 5), one of the latter being a driving gear wheel. This chain is given a constant, but adjustable forward movement for rotation about the body 4 of trolley 21 as well as the mandrel 31 carrying the reel or roll 22. This reel or roll 22 is subjected to the preventive action of a coil spring 33 (FIG. 8) to provide an adjustable braked unwinding for the film from the mandel 31. The mandrel is vertically movable mounted with respect to a structure 34 by means of a bevel gear pair 35 and toothing 36 provided on the mandrel, so that reels or rolls of different height can be used.

As above pointed out, said cradle 9 is wheeled and has an assembly of wheels 18, drawbar 6 and a pair of spacers 19. These spacers 19 comprise a U-iron of F length having the flanges thereof facing the longitudinal axis of the apparatus. Moreover, at the opposite end of the axle 18', such spacers are provided with rubber pads 37. Said length F is selected so that the spacers 19 will continuously press against the rotating press 3, except when for enabling the ejection of bale 4 from press 3, the apparatus 1 is caused to move away by a distance D from the press.

A guide assembly 38 mounted on wheels or rollers slides between the two flanges 19' of said spacers 19, which assembly has integral therewith a unit comprising rods 6' and crosspiece 6" making up the drawbar 6 of triangular shape. It clearly appears from FIG. 4 that said drawbar 6 is movable through a stroke "D" in the same median plane of the two spacers 19. The stroke or displacement D is provided by a hydraulic piston 39, one end of which is pivoted to the axle 18' of the wheel assembly 18 and the other end at the connection location 40 of the drawbar to the rotating press.

Transversely of the spacers 19 and at a distance G above the latter (FIG. 2), there is arranged the above mentioned series of idle rollers, but preferably driven by the motor 5 for conveying the bale being ejected from the press to within the cradle, or to upon the cylindrical rollers 13. The sliding surface, comprising said rollers 5, is provided somewhat above the upper plane of the track 20, encircling the cradle, so that the continued conveyance of the bale from the press to the apparatus is in any case ensured.

Unloading of the packed bale from the apparatus 1 is effected upon tilting of the cradle at the bearing locations 42 on the axle 18'. The tilting means comprise a hydraulic piston 43 (FIG. 2), pivotedly mounted with one end of one of said spacers 19 and with the other end to the respective sided 11 of the cradle.

Advantageously, the band coil type of wrapping, to provide a compact covering of a hay bale, which wrapping is obtained by a film being unwound from a reel or roll rotating about the bale, the axis of which coincides with the median height of the reel or roll with simultaneous rotation of the bale about its own axis, is completed by a supplementary peripheral wrapping. To this end, according to FIG. 2, from a reel or roll 44 with axis parallel to the axis of bale 4 and during wrapping of the latter, the film 44' is unwound, which additionally and peripherally wraps up said bale being cross- wrapped, in order to provide a further protection to the bale, particularly against any mechanical damages.

Figure 10:
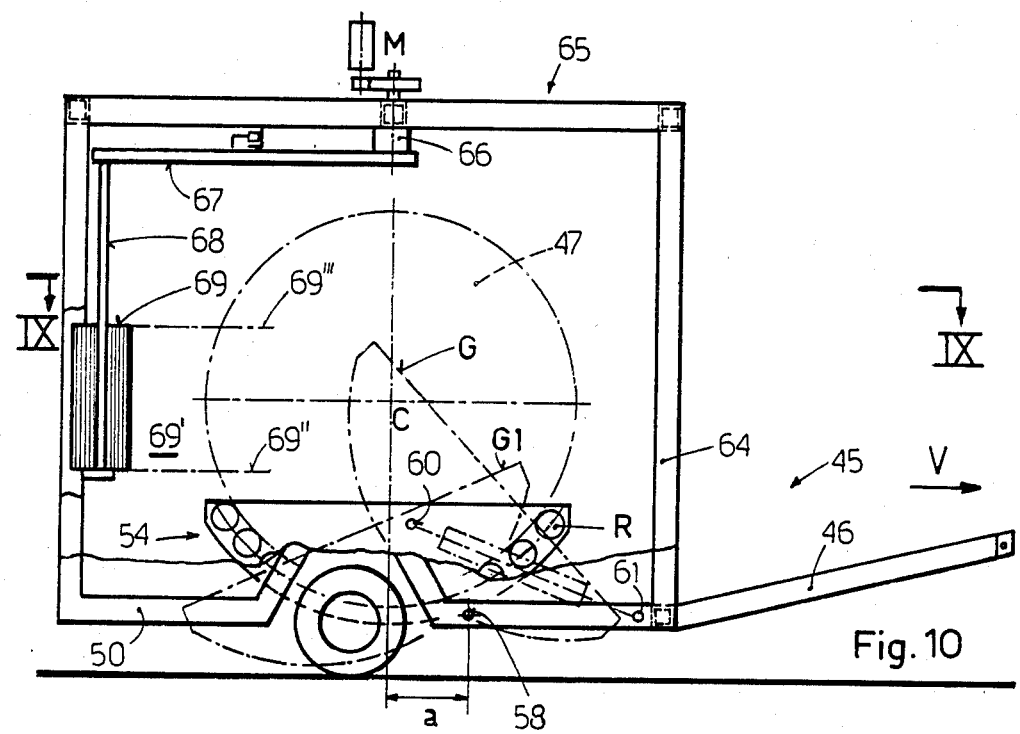
FIG. 10 is a side elevational view and partly sectional view of a further embodiment of the machine.
Figure 11:
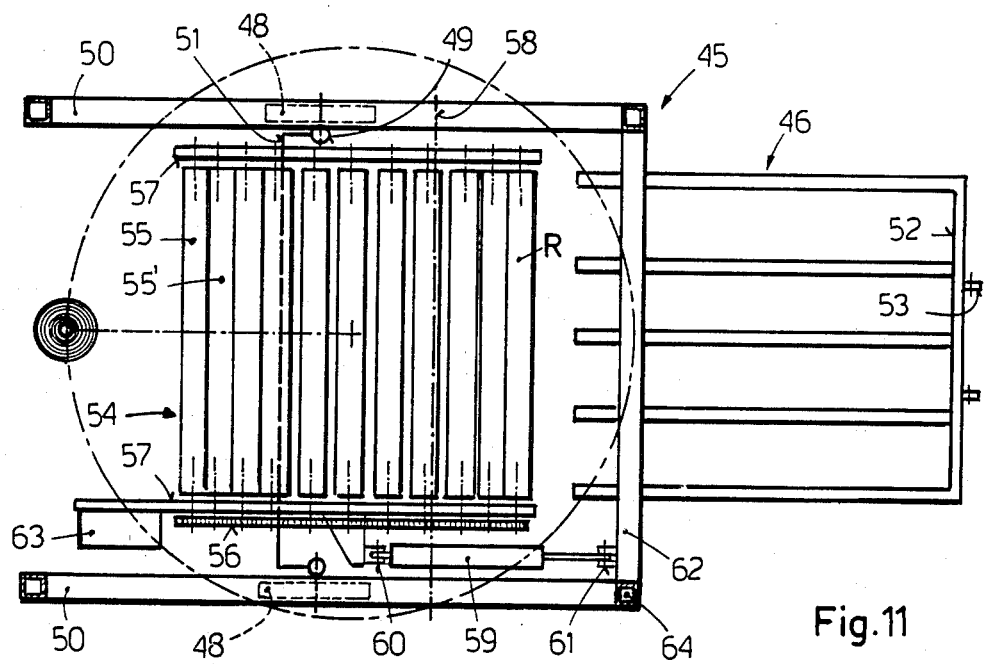
FIG. 11 is a cross-sectional view thereof taken along the plane through II—II of FIG. 10.

As an example of possible modifications, provision is made for rotating the cradle about a vertical axis thereof, maintaining a stationary condition the film unwinding reel or roll; it is also provided to use the apparatus as integrating part of the rotorpresses. To this end, and as schematically shown in FIG. 10, it is provided to space apart, by raising by suitable means, the upper half of the press by somewhat larger amount Z than the height of the film being used, to wrap the bale continuously rotated by the rollers of the lower half of the press.

Referring to the next embodiment, the machine comprises a wheeled structure 45, forwardly provided with a preferably sloping plane 46, on which the cylindrical bale 47 from the press is deposited.

Said structure 45 bears on a pair of wheels 48 rotatably mounted at 49 relative to lower longitudinal members 50 of the structure. Advantageously, said wheels 48 are interconnected by a grooseneckshaped bar 51. The front crosspiece 52 of the sloping plane is provided with a pair of brackets 53 for connection to the corresponding brackets of the preceding press.

Said connection is preferably provided as a rigid connection in a horizontal plane to allow for unloading the bale from the press, even when the latter along with the apparatus is moving along a curvilinear path.

A cradle 54 is arranged in the structure 45 which along a sector of circle arc a plurality of cylindrical rollers 55, 55', etc. is provided. These rollers cooperate with another by gear wheels 56, of which at least one is driven by a motor (not shown). The skirts of the various cylindrical rollers 55, 55' are arranged with a slight interspace therebetween and the diameter thereof is about 120 mm. It was conveniently deemed not to power the extreme roller of the cradle, that is the roller R closest to the sloping plane.

The cradle 54 comprises two sides 57 rigidly connected to each other.

The cradle 54 is tiltable about an axis 58, which is parallel arranged to a vertical plane through the longitudinal axis of said rollers. Said axis 58, and when the body or bale 47 is being wrapped up, that is when the cradle 54 is horizontally arranged, is advantageously arranged as displaced by an amount a (FIG. 10) relative to the vertical plane through the center C of bale 47.

For craddle upsetting, and this both in the press direction to receive the bale to be wrapped up, and to unload the wrapped up bale, at least one cylinder-piston assembly 59 is provided. A first connection location (60) for the latter is provided on one side of the cradle, and a second connection location 61 for the latter is provided on the lower crosspiece 62 of said structure 45. A hydraulic unit 63 is driven by electric current supplied by a battery, or by electric power generated by the tractor trailing the press as well as the apparatus.

FIG. 10 schematically shows by dash-dot lines said limit positions for bale reception G and unloading thereof G1 from the apparatus.

The lower longitudinal member 50 are overlapped by supports or mountings 64, in turn serving as bearing elements for further longitudinal members and upper crosspieces 65. By means of a housing 66, an arm 67 is rotatably suspended to the latter and has a support or mounting 68 extending vertically downwardly therefrom for the reel or roll 69, from which the film 69' is unwound. The arm 67, and the reel or roll therewith, is subjected to a rotational movement by means of a motor unit M (FIG. 10) relative to said housing 66.

Said housing 66 is arranged along a line which, as seen in top plan view, is perpendicular to the cradle center, and is arranged at least somewhat outside of the floor space zone of the bale 47 and sloping movement of the cradle 54.

The above mentioned electric motors are supplied by battery mounted and supplied by the current provided by the tractor, that is by D.C. current 12–14 V. On the other end, the hydraulic pressure is supplied by a suitable control on the tractor 2 or in case on the apparatus.

What I claim is:

1. An apparatus for wrapping a compressed hay bale with an extensible self-adhesive film comprising a cradle, said cradle comprising means to support a cylindrical compressed hay bale, said cradle further comprising a multiplicity of at least three rollers distributed in a circular arc around a compressed cylindrical hay bale supported in said cradle, said rollers being located closely adjacent one another and comprising means to rotate a cylindrical hay bale about its axis while supported in said cradle, means for winding a strip of film about a bale while supported in said cradle, said winding means comprising a reel and means to move said reel in a path extending around said cradle and a bale supported in said cradle, carriage means supporting said cradle including a pair of wheels for transporting said carriage means, and means for tilting said cradle on said carriage means about a horizontal axis arranged parallel to the axes of said rollers for unloading a bale from said cradle motor traction means, a press connected to said motor traction means to be drawn thereby, said press comprising means to press hay into a cylindrical bale, means hooking said cradle to said press to be drawn thereby, said apparatus further including means to expel a cylindrical bale from said press and transport the expelled bale to said cradle.

2. An apparatus as recited in claim 1, wherein said means for moving said reel comprises a track surrounding said cradle and a trolley bearing said reel riding on said track.

3. An apparatus as recited in claim 1, wherein said means for transporting a bale from said press to said cradle means defining a sloping plane extending from said cradle in an upward direction to said press arranged to cause a hay bale to roll from said press to said cradle.

4. An apparatus according to claim 1 or 3 wherein said tilting means is operable to tilt said cradle in either direction about said horizontal axis for loading or unloading a hay bale.

5. An apparatus as recited in claim 1 or 3 further comprising a motor connected to drive a plurality of said rollers to rotate a cylindrical hay bale supported in said cradle about the axis of said hay bale, one of said rollers adjacent the edge of said cradle being freely rotatable on its axis as an idler and not driven by said motor.

6. An apparatus as recited in claim 1, further comprising an upper portion including a second set of rollers and positioned above said first mentioned rollers, said upper portion being spaced from said first mentioned rollers by an amount greater than the heighth of the film between said upper and lower edges of said film.

7. An apparatus as recited in claim 1, wherein said horizontal axis is displaced horizontally from a vertical plane passing through the axis of a bale supported in said cradle, and wherein said winding means is mounted on said carriage means independently of said cradle so that the position of said winding means is independent of the tilting of said cradle.

8. An apparatus as recited in claim 7, wherein there is provided means to load a compressed bale into said cradle and wherein said axis is displaced from said vertical plane in the direction of said loading means.

9. An apparatus as recited in claim 1, wherein said means to move said reel is supported by a housing mounted on said carriage means positioned directly above a bale supported in said cradle.

10. An apparatus for wrapping a compressed bale with an extensible self-adhesive film comprising a cradle, said cradle comprising means to support a cylindrical compressed hay bale, said cradle further comprising at least three rollers distributed in the arc around a compressed cylindrical hay bale supported in said cradle, said rollers comprising means to rotate a cylindrical hay bale about its axis while supported in said cradle, means for winding a strip of film about a bale while supported in said cradle, said winding means comprising a reel and means to move said reel in a path extending around said cradle and a bale supported in said cradle, and means for tilting said cradle about a horizontal axis for unloading a bale from said cradle, motor traction means, a press connected to said motor traction means to be drawn thereby, said press comprising means to press hay into a cylindrical bale, means hooking said cradle to said press to be drawn thereby, said apparatus further including means to expel a cylindrical bale from said press and transport the expelled bale to said cradle, carriage means supporting said cradle including a pair of wheels mounted on a common axis, a pair of parallel elements extending perpendicular from the axis of said wheels, said elements comprising means to maintain a minimum distance between said carriage means and said press, said means hooking said carriage means to said press comprising a draw bar, means connected to said draw bar and said parallel elements guiding said draw bar for movement on said parallel elements and means for selectively providing a displacement between said draw bar and said carriage means to move said cradle away from said press and allow tilting of said cradle.

* * * * *

UNITED STATES PATENT AND TRADEMARK OFFICE
CERTIFICATE OF CORRECTION

PATENT NO. : 4,685,270

DATED : August 11, 1987

INVENTOR(S) : Dario Brambilla

It is certified that error appears in the above-identified patent and that said Letters Patent are hereby corrected as shown below:

Column 1, line 18, change "is" to --in--;

line 33, change "or" to --of--;

Column 3, line 9, change "setting" to --upsetting--;

line 28, chane "and" to --are--;

line 45, change "claim" to --chain--;

line 55, change "mandel" to --mandrel--;

Column 4, line 28, change "of" to --on--;

line 45, change "a" to --at--;

Column 5, line 33, change "member" to --members--;

UNITED STATES PATENT AND TRADEMARK OFFICE
CERTIFICATE OF CORRECTION

PATENT NO. : 4,685,270

DATED : August 11, 1987

INVENTOR(S) : Dario Brambilla

It is certified that error appears in the above-identified patent and that said Letters Patent is hereby corrected as shown below:

Column 6, line 17, after "cradle" insert --comprises--;

line 56, change "the" to --an--.

Signed and Sealed this

Twenty-ninth Day of December, 1987

Attest:

DONALD J. QUIGG

Attesting Officer      Commissioner of Patents and Trademarks